Patented Sept. 6, 1938

2,129,317

UNITED STATES PATENT OFFICE 2,129,317

PROCESS FOR THE MANUFACTURE OF LAEVOASCORBIC ACID

Franz Elger, Basel, Switzerland, assignor to Hoffmann-La Roche Inc., Nutley, N. J., a corporation of New Jersey No Drawing. Application June 6, 1936, Serial No. 84,010. In Switzerland June 18, 1935

5 Claims. (Cl. 260—123)

This invention relates to the production of laevo-ascorbic acid from 2-keto-laevo-gulonic acid or its derivatives. It is known that laevo-ascorbic acid can be obtained by the action of alkaline reagents on 2-keto-laevo-gulonic acid or its esters and subsequent treatment with acids, or by warming an acid solution of 2-keto-laevo-gulonic acid or such of its derivatives as are readily hydrolyzable by acids.

It has now been found that it is particularly advantageous to warm 2-keto-laevo-gulonic acid or such of its derivatives as are readily hydrolyzable by acids in acidified alcoholic solutions.

In this way laevo-ascorbic acid is readily obtained in good yield in the pure state.

Example 1

204 parts by weight of 2-keto-laevo-gulonic-acid-methyl-ester are dissolved in 4000 parts by weight of absolute alcohol and 120 parts by weight of hydrogen chloride passed into the solution. The mixture is boiled under reflux. After boiling for about 4 hours, evaporating at 40° C. in the vacuo and drying the residue well, it soon crystallizes. The crystalline mass is soaked well with butyl alcohol, separated from the butyl alcohol and washed with acetic acid and ether. The remaining laevo-ascorbic acid is only slightly grey in color. It can be obtained in a pure state by crystallization from methanol.

Example 2

49 parts by weight of diacetone-2-keto-laevo-gulonic-acid-mono-hydrate are boiled under reflux with 650 parts by weight of absolute alcoholic hydrochloric acid (3 per cent.). After 4 hours it is evaporated to dryness and the residue worked up as described in Example 1.

Example 3

212 parts by weight of 2-keto-laevo-gulonic acid are dissolved in 4000 parts by weight of a freshly prepared absolute alcoholic hydrochloric acid (3 per cent.) and boiled under reflux. After 5 hours it is evaporated in vacuo and the residue worked up as described in Example 1.

I claim:

1. The process for the manufacture of laevo-ascorbic acid which consists in heating compounds of the general formula

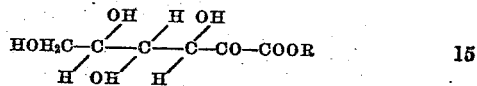

wherein R represents hydrogen or alkyl, with acids in a substantially anhydrous alcohol solution.

2. The process for the manufacture of laevo-ascorbic acid which consists in heating such derivatives of 2-keto-laevo-gulonic acid as are readily hydrolyzable by acids with acids in a substantially anhydrous alcohol solution.

3. The process for the manufacture of laevo-ascorbic acid which consists in heating diacetone-2-keto-laevo-gulonic acid with acids in a substantially anhydrous alcohol solution.

4. The process for the manufacture of laevo-ascorbic acid which consists in heating 2-keto-laevo-gulonic acid in a substantially anhydrous alcohol solution having an acid reaction.

5. The process for the manufacture of laevo-ascorbic acid which consists in heating 2-keto-laevo-gulonic-acid-esters in a substantially anhydrous alcohol solution having an acid reaction.

FRANZ ELGER.